(12) United States Patent
Hu et al.

(10) Patent No.: US 12,452,554 B2
(45) Date of Patent: Oct. 21, 2025

(54) SYSTEM, METHOD, ELECTRONIC DEVICE, AND COMPUTER-READABLE STORAGE MEDIUM FOR SHADING CORRECTION IN IMAGE ACQUISITION

(71) Applicant: Black Sesame Technologies (Shenzhen) Co., Ltd., Shenzhen (CN)

(72) Inventors: Anzhou Hu, Wuhan (CN); Louise Law, San Jose, CA (US); Chao Wang, Shanghai (CN); Donghui Wu, San Jose, CA (US)

(73) Assignee: Black Sesame Technologies (Shenzhen) Co., Ltd., Shenzhen (CN)

( * ) Notice: Subject to any disclaimer, the term of this patent is extended or adjusted under 35 U.S.C. 154(b) by 126 days.

(21) Appl. No.: 18/237,821

(22) Filed: Aug. 24, 2023

(65) Prior Publication Data

US 2024/0073554 A1   Feb. 29, 2024

(30) Foreign Application Priority Data

Aug. 24, 2022   (CN) .......................... 202211024160.0

(51) Int. Cl.
| | |
|---|---|
| *H04N 25/61* | (2023.01) |
| *H04N 23/72* | (2023.01) |
| *H04N 23/74* | (2023.01) |
| *H04N 23/75* | (2023.01) |
| *H04N 23/76* | (2023.01) |

(52) U.S. Cl.
CPC ............. *H04N 25/61* (2023.01); *H04N 23/72* (2023.01); *H04N 23/74* (2023.01); *H04N 23/75* (2023.01); *H04N 23/76* (2023.01)

(58) Field of Classification Search
CPC ........ H04N 25/61; H04N 23/72; H04N 23/74; H04N 23/75; H04N 23/76; H04N 23/81; G03B 15/06
See application file for complete search history.

(56) References Cited

U.S. PATENT DOCUMENTS

| | | | | |
|---|---|---|---|---|
| 2007/0133212 | A1* | 6/2007 | Lin ........................... | F21V 3/04 |
| | | | | 362/341 |
| 2009/0279178 | A1* | 11/2009 | Cui ...................... | H04N 1/0305 |
| | | | | 359/601 |
| 2015/0116480 | A1* | 4/2015 | Liang ................... | G05D 1/0246 |
| | | | | 348/118 |
| 2015/0365576 | A1* | 12/2015 | Wang ................... | H04N 17/002 |
| | | | | 348/251 |

* cited by examiner

*Primary Examiner* — Mekonnen D Dagnew
(74) *Attorney, Agent, or Firm* — Shun Yao; Yao Legal Services, Inc.

(57) ABSTRACT

The present application provides a system and a method for acquiring an image, an electronic device, and a computer-readable storage medium. The system for acquiring an image provided in the present application provides a correction reference with uniform illumination by adjusting the positional relationship between the light source and the correction reference, and acquires at least one image of the correction reference by the image acquisition device to be corrected. Wherein, the correction image obtained based on the at least one image may be used to perform lens shading correction on the image acquisition device. The system for acquiring an image does not require the use of an expensive integrating sphere, which may reduce purchase and maintenance costs of a testing device for obtaining a correction image.

20 Claims, 6 Drawing Sheets

310 — adjusting the positional relationship between the light source and the correction reference, as well as the direction in which the light source illuminates the correction reference, so that illuminations in different regions on the correction reference meet the predetermined uniformity condition 320 — acquiring at least one image of the correction reference by the image acquisition device to be corrected if the uniformity condition is met 330 — generating the correction image based on the at least one image, wherein the correction image is used to perform lens shading correction on the image acquisition device

SYSTEM, METHOD, ELECTRONIC DEVICE, AND COMPUTER-READABLE STORAGE MEDIUM FOR SHADING CORRECTION IN IMAGE ACQUISITION

RELATED APPLICATION

This application hereby claims priority under 35 U.S.C. § 119 to the following foreign patent application: China Patent Application No. 202211024160.0 filed Aug. 24, 2022.

FIELD

The present application relates to the technical field of image acquisition, and particularly, to a system, method, electronic device, and a computer-readable storage medium for acquiring an image.

BACKGROUND

With the rapid development of digital camera technology, wide-angle camera is increasingly widely used in our daily life and work. Lens of wide-angle camera is suitable for taking photos of relatively large scenes such as architecture, scenery and other subjects, due to its short focal length, wide viewing angle, and long depth of field and other features.

However, when an imaging distance of a wide-angle camera is relatively far, oblique beams that may pass through the camera lens will gradually decrease as the field of view gradually increases. Thereby, resulting in a phenomenon of brighter central region and darker edges in a captured image, also known as vignetting. In order to solve the problem of vignetting mentioned above, lens shading correction technology may be used, which means that shading at an edge of an image may be compensated for brightness through lens shading correction, so that the image presented to a user has good brightness uniformity.

Usually, traditional lens shading correction technologies use an integrating sphere device to obtain a correction image, and use the correction image to calculate a correction parameter of a camera, thereby using this correction parameter to correct the camera. However, the integrating sphere device has problems such as high purchase cost and the need for regular maintenance, etc.

SUMMARY

In view of this, embodiments of the present application provide a system and a method for acquiring an image, an electronic device, and a computer-readable storage medium, which may reduce purchase and maintenance costs of a testing device for obtaining a correction image.

In a first aspect, embodiments of the present application provide a system for acquiring an image, which includes a light source, a correction reference, and an image acquisition device to be corrected. The light source is configured to adjust a positional relationship thereof relative to the correction reference and a direction in which the light source illuminates the correction reference, so that illuminations of light emitted by the light source in different regions on the correction reference meet a predetermined uniformity condition. The image acquisition device is configured to acquire at least one image of the correction reference if the uniformity condition is met. The at least one image is used to obtain a correction image. The correction image is used to perform lens shading correction on the image acquisition device.

According to certain embodiments of the present application, the image acquisition device is provided on a normal line that passes through the center point of the correction reference. And, the light source includes a plurality of light sub-sources which are symmetrically provided along the normal line as an axis.

According to certain embodiments of the present application, the image acquisition device is provided between at least one light source and the correction reference.

According to certain embodiments of this application, the uniformity condition is that a ratio of the difference between the maximum and minimum illumination to the minimum illumination is less than or equal to 20%.

According to certain embodiments of the present application, the system further includes at least one layer of diffuser that is provided in front of a lens of the image acquisition device.

According to certain embodiments of the present application, the at least one layer of diffuser includes several layers of flexible diffusers, and is configured to be symmetrically provided in an arc shape in front of the lens of the image acquisition device.

According to certain embodiments of the present application, the at least one layer of diffuser is a frosted sheet.

According to some embodiments of the present application, the distance D between a surface of the at least one layer of diffuser close to the lens of the image acquisition device and the lens of the image acquisition device meets that $0 \text{ mm} < D \leq 2 \text{ mm}$.

According to certain embodiments of the present application, the system further includes a controller that is configured to adjust the positional relationship between the light source and the correction reference, as well as the direction in which the light source illuminates the correction reference, through a drive device, so that the illuminations of the light emitted by the light source in different regions on the correction reference meet the uniformity condition.

According to certain embodiments of the present application, the system further includes a plurality of illumination detection devices distributed in different regions for detecting illuminations in different regions.

In a second aspect, embodiments of the present application provide a method for acquiring an image, which includes adjusting a positional relationship between a light source and a correction reference, as well as a direction in which the light source illuminates the correction reference, so that illuminations in different regions on the correction reference meet a predetermined uniformity condition; acquiring at least one image of the correction reference by an image acquisition device to be corrected if the uniformity condition is met; and generating a correction image based on the at least one image, wherein the correction image is used to perform lens shading correction on the image acquisition device.

According to certain embodiments of the present application, the image acquisition device is provided on a normal line that passes through the center point of the correction reference. And, the light source includes a plurality of light sub-sources. In addition, the adjusting a positional relationship between a light source and a correction reference includes adjusting the positional relationship between the light source and the correction reference under the condition that the plurality of light sub-sources are symmetrically provided along the normal line as an axis.

According to certain embodiments of the present application, at least one layer of diffuser is provided in front of a lens of the image acquisition device.

According to certain embodiments of the present application, the acquiring at least one image of the correction reference by an image acquisition device to be corrected includes utilizing the image acquisition device to acquire at least one image from a plurality of different angles, respectively, to obtain a plurality of images. And, the generating a correction image based on the at least one image includes averaging the plurality of images to generate the correction image.

According to certain embodiments of the present application, the different angles include a forward direction in which the lens of the image acquisition device faces the correction reference, as well as four directions of up, down, left, and right at predetermined angles to the forward direction, with the predetermined angles not exceeding 45 degrees.

In a third aspect, embodiments of the present application provide an electronic device, which includes a processor; and a memory for storing an instruction executable for the processor, wherein the processor is used to execute the method for acquiring an image described in the second aspect above.

In a fourth aspect, embodiments of the present application provide a computer-readable storage medium that stores a computer program for executing the method for acquiring an image described in the second aspect above.

In a fifth aspect, embodiments of the present application provide an apparatus for acquiring an image, which includes an adjustment module for adjusting a positional relationship between a light source and a correction reference, as well as a direction in which the light source illuminates the correction reference, so that illuminations in different regions on the correction reference meet a predetermined uniformity condition; an acquisition module for acquiring at least one image of the correction reference by an image acquisition device to be corrected if the uniformity condition is met; and a generation module for generating a correction image based on the at least one image, and wherein the correction image is used to perform lens shading correction on the image acquisition device.

According to the embodiments of the present application, a uniform illumination condition is provided on the correction reference by setting the positional relationship between the light source and the correction reference. And, an image acquisition device to be corrected is utilized to acquire an image of the correction reference, based on which, a correction image for lens shading correction of the image acquisition device is obtained. Thus, the system for acquiring an image does not require use of an expensive integrating sphere, which may reduce purchase and maintenance costs of a testing device for obtaining a correction image.

DETAILED DESCRIPTION OF EMBODIMENTS

The following will provide a clear and complete description of the technical solutions in the embodiments of the present application in conjunction with the accompanying drawings. Obviously, the described embodiments are only a part but not all of the embodiments of the present application. Based on the embodiments in the present application, all other embodiments obtained by those skilled in the art without creative labor fall within the scope of protection of the present application.

Related Technologies

Integrating sphere, also known as luminous flux sphere, is a hollow complete spherical shell with an inner wall coated with a flat layer of diffuse reflective material. Its typical function is to collect light which is then used as a scattering light source. The integrating sphere may achieve uniform Lambertian diffuse scattering light source output with very uniform brightness. Due to the fact that the integrating sphere may provide an environment with uniform brightness, traditional lens shading correction uses the integrating sphere device to acquire a correction image, and then processes the correction image through an algorithm to address the problem of uneven brightness in an image captured by a camera.

However, the integrating sphere device has a high purchase cost, and also requires frequent maintenance during use. Therefore, it is urgent to provide a simple and practical method and system for acquiring an image, which may achieve acquisition of a correction image without use of the integrating sphere device.

Exemplary System

Figure 1:
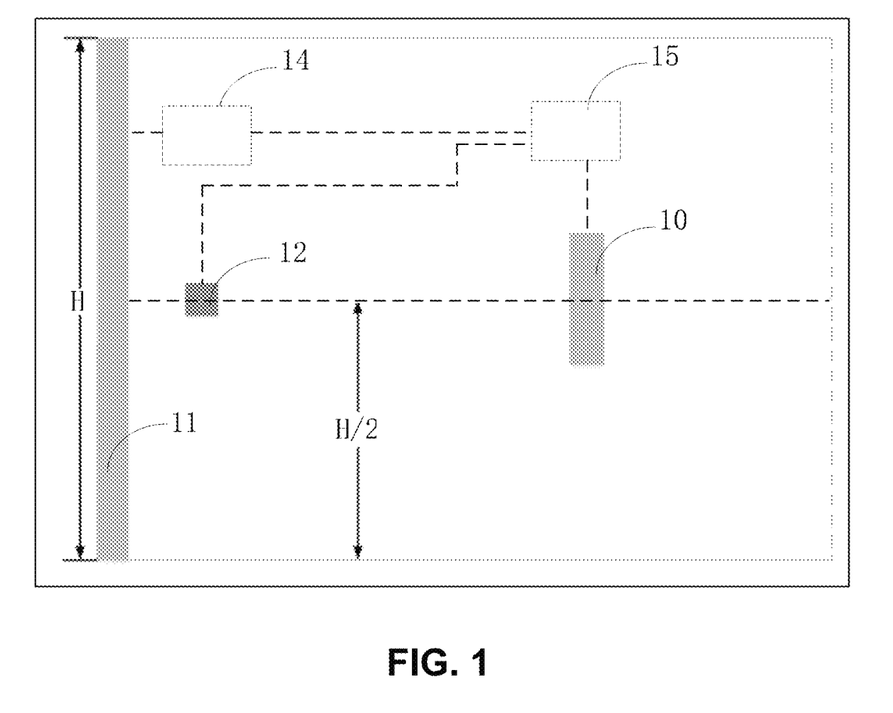
FIG. 1 shows a schematic structure diagram of a system for acquiring an image according to an exemplary embodiment of the present application.

FIG. 1 shows a schematic structure diagram of a system for acquiring an image according to an exemplary embodiment of the present application.

As shown in FIG. 1, the system for acquiring an image includes a light source 10, a correction reference 11, and an image acquisition device 12. The image acquisition device 12 may be provided between the light source 10 and the correction reference 11.

The correction reference 11 may be an object with a flat surface, such as a wall or flat plate, or the like. Specifically, the correction reference 11 may include gray walls, gray paperboards, or gray curtains. For example, the correction reference 11 may include 18% of gray flat walls, 18% of gray flat paperboards, or 18% of gray flat curtains.

The image acquisition device 12 may include standard lens cameras, wide-angle lens cameras, ultra-wide lens cameras, telephoto lens cameras, and the like.

The light source 10 may be a combination of a pair or a plurality of light sources. Specifically, the light source 10 may include incandescent lamps, energy-saving lamps, metal halide lamps, and LED lamps (light emitting diodes). For example, the light source 10 may be a flexible LED lamp.

The light source 10 is configured to adjust a positional relationship thereof relative to the correction reference 11 and a direction in which the light source 10 illuminates the correction reference 11, so that illuminations of light emitted by the light source 10 in different regions on the correction reference 11 meet a predetermined uniformity condition. The image acquisition device 12 is configured to acquire at least one image of the correction reference 11 if the uniformity condition is met. The at least one image is used to obtain a correction image. The correction image is used to perform lens shading correction on the image acquisition device 12.

Specifically, the light emitted by the light source 10 is illuminated on the correction reference 11. By adjusting the positional relationship between the light source 10 and the correction reference 11, as well as the direction in which the light source 10 illuminates the correction reference 11, the illuminations in different regions on the correction reference 11 may meet the predetermined uniformity condition. Subsequently, the image acquisition device 12 is utilized to acquire an image of the correction reference 11 to obtain the correction image.

The correction image is used to perform lens shading correction on the image acquisition device 12. Lens shading correction is aimed at solving the problem of shadings around the lens caused by uneven optical refraction of the lens. For example, based on the correction image, a shading correction algorithm may be used to calculate a compensation coefficient for brightness of a pixel in a shading region. An image acquired by the image acquisition device 12 undergone shading correction has good brightness uniformity, improving the phenomenon of darker edges in the image. For example, the correction image may be used to calculate a correction parameter for the image acquisition device 12. The correction parameter may be stored in the image acquisition device 12, and may be called when the image acquisition device 12 needs shading correction to capture an image, to obtain the image that has eliminated vignetting and uniform brightness. The correction parameter may include a brightness parameter and a colorimetric parameter. The brightness parameter may be a ratio of an average brightness of the central region of the image to the average brightness of each region. The colorimetric parameter may be a ratio of an average chroma value of the central region to an average chroma value of each region.

It should be noted that, the higher the uniformity of illumination of the correction reference 11, the better, in order to provide a uniform light source environment for acquisition of the correction image, improve accuracy of the correction parameter, and improve the correction effect of lens shadings. Illumination, also known as luminous intensity, refers to the luminous flux received per unit region, which is a physical quantity used to represent a brightness degree of an illuminated surface.

According to an embodiment, illumination uniformity may be used to represent the predetermined uniformity condition. Here, the illumination uniformity refers to a ratio of the minimum illumination in different regions to the average illumination on the entire correction reference, i.e., the illumination uniformity=minimum illumination value/average illumination value. Alternatively, according to another embodiment, the illumination uniformity may also refer to a ratio of the minimum illumination in different regions to the maximum illumination on the entire correction reference. The closer the illumination uniformity is to 1, the better. The minimum and maximum illumination values may be calculated by the per-pixel calculation method. When differences between the illumination uniformity and 1 in different regions on the correction reference are less than a predetermined threshold, it is determined that the predetermined uniformity condition is met. For example, the predetermined uniformity condition may be that the illumination uniformity is greater than or equal to 90%. It should be understood that, the illumination uniformity is not specifically defined in this application, and may be set by those skilled in the art according to specific circumstances.

According to another embodiment, the predetermined uniformity condition may be that a ratio of the difference between the maximum and minimum illumination to the minimum illumination is less than or equal to 20%. Alternatively, the predetermined uniformity condition may be that the ratio of the difference between the maximum and minimum illumination to the minimum illumination is less than or equal to 20% simultaneously in different regions, and the illumination uniformity is greater than or equal to 90%.

According to an embodiment, when the image acquisition device 12 is utilized to capture an image, the light source 10 may be adjusted first to a suitable position, and the illumination direction of the light source may be adjusted, so that illuminations of illuminated light are uniform in different regions and between different regions on the correction reference 11. Then, the image acquisition device 12 may be utilized to capture the correction reference 11 to obtain at least one image. The different regions on the correction reference 11 may be evenly divided based on the area of the correction reference. It should be noted that, the area sizes of the regions may be set based on the dimension of the correction reference, and is not defined in the embodiments of the present application.

Optionally, the above system may further include an illumination measurement device 14 and a controller (or computing device) 15. The illumination measurement device 14 is used to detect illuminations of light in different regions on the correction reference 11. The computing device 15 is used to adjust the light source 10 to a suitable position by controlling a drive device, and adjust the illumination direction of the light source 10 by another drive device, according to the illuminations in different regions on the correction reference 11 detected by the illumination measurement device 14, so that the illuminations in different regions on the correction reference 11 are uniform.

Optionally, the computing device 15 is used to adjust the image acquisition device 12 to a suitable position by controlling the drive device, so that the image acquisition device 12 displays as few shadings as possible on the correction reference 11, to ensure that the brightness of the acquired image is not affected by other factors besides uniform illumination.

It should be understood that, the system for acquiring an image may be provided in a normal image quality laboratory environment. Specifically, width and height of the laboratory may meet the needs of wide-angle photography with cameras, to provide a sufficient space for providing the correction reference that has good flatness. For example, the correction reference may have a width of greater than or equal to 4 m, and a height of greater than or equal to 2.5 m. It should be understood that, dimension of the correction reference may be set by those skilled in the art based on the wide-angle FOV of the image acquisition device, and is not defined in any way in the embodiments of the present application.

The embodiments of the present application provide a system for acquiring an image. The system adjusts a positional relationship between a light source and a correction reference and a direction in which the light source illuminates the correction reference, so that illuminations of light emitted by the light source in different regions on the correction reference meet a predetermined uniformity condition. Then, at least one image of the correction reference is acquired by the image acquisition device if the illuminations meet the uniformity condition. And, a correction image is obtained based on the at least one image, to perform lens shading correction on the image acquisition device. The system for acquiring an image according to the embodiments of the present application does not require use of an expensive integrating sphere, which may reduce purchase and maintenance costs of a testing device for obtaining a correction image.

Figure 2:
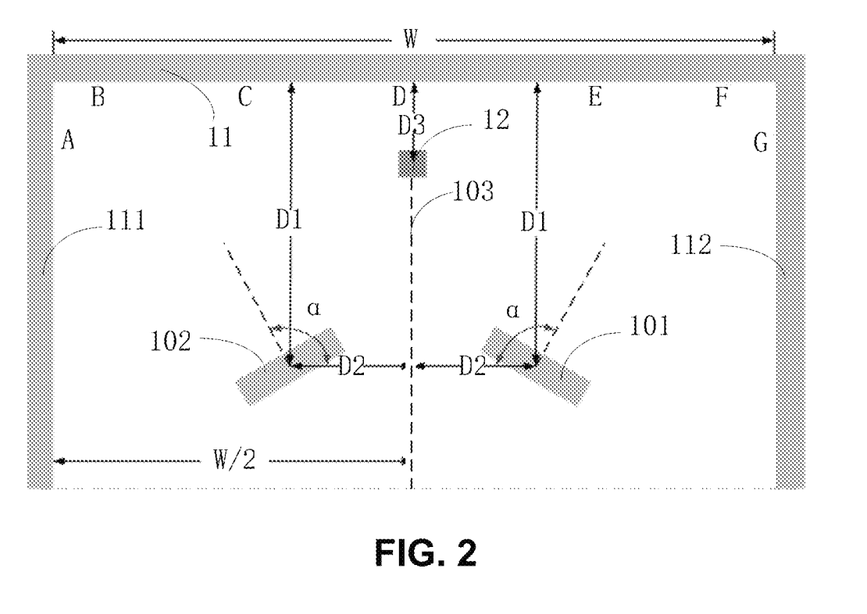
FIG. 2 shows a schematic structure diagram of a system for acquiring an image according to another exemplary embodiment of the present application.

FIG. 2 shows a schematic structure diagram of a system for acquiring an image according to another exemplary embodiment of the present application.

It should be noted that, the system for acquiring an image according to this embodiment is another example of the system for acquiring an image according to the embodiment of FIG. 1. Please refer to the above description for functions of the light source, the correction reference, and the image acquisition device to be corrected included in this system. In order to avoid repetition, the similarities will not be elaborated.

As shown in FIG. 2, the light source of the system for acquiring an image includes a first light sub-source 101 and a second light sub-source 102. The image acquisition device 12 is located on a normal line 103 that passes through the center point of the correction reference 11 (hereinafter referred to as normal line 103), and the lens thereof has a front facing and perpendicular to the correction reference 11. The first and second light sub-sources 101 and 102 are symmetrically provided with respect to the normal line 103. By adjusting a vertical distance D1 between the first and second light sub-sources 101 and 102 and the correction reference 11, a vertical distance D2 between the first and second light sub-sources 101 and 102 and the normal line 103, and irradiation angles α of the first and second light sub-sources 101 and 102, the illuminations in different regions on the correction reference 11 may meet the predetermined uniformity condition. The system according to this embodiment is conducive to providing a correction reference with uniform brightness, providing a uniform light source environment for acquisition of the correction image, thereby improving accuracy of the correction parameter, and improving the correction effect of lens shadings.

According to an embodiment, the correction reference 11 may be divided into different regions, such as regions B to F. according to some embodiments, adjacent regions on the correction reference 11 also meet the uniformity requirement of illumination. For example, a region A on a first correction reference 111 and a region G on a second correction reference 112 also meet the uniformity requirement of illumination. It should be noted that, division of the regions may be set differently based on the dimension of the correction reference 11 and the field of view of the image acquisition device 12 to be corrected, and is not defined in the embodiments of the present application.

According to an embodiment, the correction reference 11 is respectively connected to the first correction reference 111 and the second correction reference 112 at the same radian, to form a correction reference with a radian. Thus, the provided correction reference that meets the uniformity condition is closer to the testing environment of an integrating sphere, and a uniform light source environment is provided for acquiring a correction image. Thereby, improving accuracy of the correction parameter and the correction effect of lens shadings.

According to an embodiment, the aforementioned predetermined uniformity condition of the system is that a ratio of the difference between the maximum and minimum illumination to the minimum illumination is less than or equal to 20%.

Alternatively, the predetermined uniformity condition may also be illumination uniformity, which is expressed as a ratio of the minimum illumination to an average illumination. Exemplarily, the illumination uniformity is greater than or equal to 90%. The higher the illumination uniformity, the better. A correction reference with uniform illumination may provide a uniform light source environment for acquiring a correction image, thereby improving accuracy of the correction parameter.

According to an embodiment, the system further includes at least one layer of diffuser that is provided in front of a lens of the image acquisition device. The provision of the diffuser may further provide uniform incident light for the image acquisition device, compensate for the illumination uniformity of the correction reference, and provide a uniform light source environment for acquiring the correction image, in order to improve accuracy of the correction parameter and thus the correction effect of lens shadings.

According to an embodiment, the at least one layer of diffuser includes several layers of flexible diffusers, and is symmetrically provided in an arc shape in front of the lens of the image acquisition device. The provision of the several layers of flexible diffusers may provide more uniform incident light, as compared to a single layer of diffuser. For example, the at least one layer of diffuser may include several layers of flexible diffusers, and be configured to be symmetrically provided in an arc shape in front of the lens of the image acquisition device.

The flexible diffusers may be provided to have a shape with a certain radian, and may be symmetrically provided in an arc shape in front of the lens. Thereby, the flexible diffusers are used to wrap the lens in all directions, to avoid light leakage, and to achieve as much or all rays of light as possible entering the lens after passing through the diffusers. Optionally, the flexible diffusers may be provided in a shape of semi-spherical surface in front of the lens. Optionally, the several layers of flexible diffusers are respectively provided in a wide-angle and non-wide-angle viewing directions of the lens. For example, the flexible diffusers are provided in a hemispherical arc shape in the wide-angle viewing direction of the lens, and in a flat surface in the non-wide-angle viewing direction of the lens, so that the diffusers in an arc shape provided in the wide-angle viewing direction and the diffusers in a flat surface provided in the non-wide-angle viewing direction compose a shape of semi-cylindrical surface, thereby wrapping the lens in all directions. The provision of the flexible diffusers may compensate for the illumination uniformity of the correction reference, and provide a uniform light source environment for acquiring a correction image, in order to improve accuracy of the correction parameter and the correction effect of lens shadings.

According to an embodiment, the at least one layer of diffuser is a frosted sheet. Specifically, a fine-grained frosted sheet may provide better uniform incident light than a coarse-grained frosted sheet.

According to an embodiment, the distance D between a surface of the at least one layer of diffuser close to the lens of the image acquisition device and the lens of the image acquisition device meets that 0 mm<D≤2 mm.

For example, the distance between the diffuser and the lens of the image acquisition device is set to 1 mm. It is demonstrated through experiments that, the correction image obtained by this setting has good brightness uniformity, and a more accurate correction parameter may be obtained. Therefore, the uniformity effect of the image obtained after lens shading correction is better.

According to an embodiment, the system further includes a controller that is configured to adjust through a drive device positions of the light source and the image acquisition device, as well as the direction in which the light source illuminates the correction reference, so that the illuminations of the light emitted by the light source in different regions on the correction reference meet the predetermined uniformity condition.

Specifically, in the case of using a pair of light sources, the controller may be used to control a drive mechanism (such as a motor) according to a predetermined strategy to drive the two light sources to translate or rotate. Thereby, adjusting the positional relationship between the light source and the correction reference, as well as the direction in which the light source illuminates the correction reference, until a light condition with uniform illumination that meets the requirements is formed on the correction reference.

According to an embodiment, the system may also include a plurality of illumination detection devices distributed in different regions for detecting illuminations in the different regions.

For example, an illumination measuring instrument may be used to detect the illuminations in different regions on the correction reference, and the measurement results thereof may be received by the controller. Further, it is determined whether the illuminations in different regions is uniform by calculating the measurement results.

Exemplary Method

Figure 3:
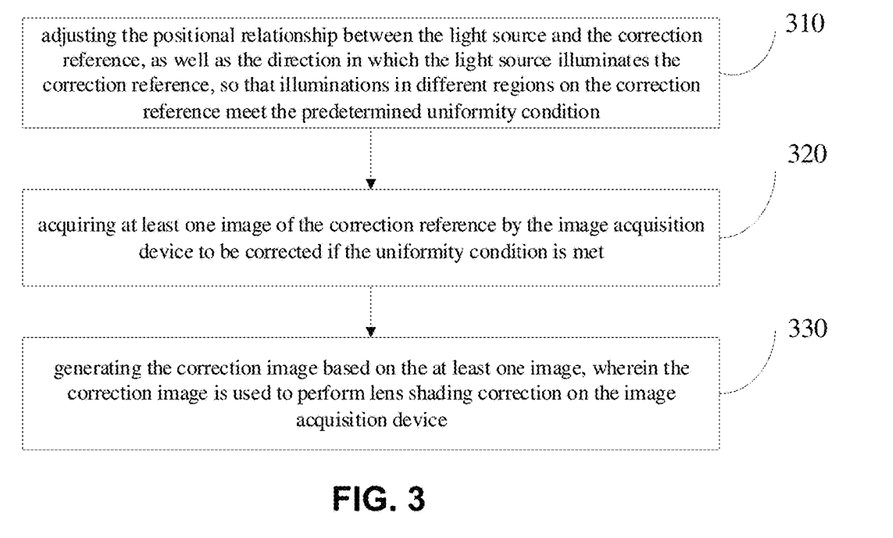
FIG. 3 shows a schematic flowchart of a method for acquiring an image according to an exemplary embodiment of the present application.

FIG. 3 shows a schematic flowchart of a method for acquiring an image according to an exemplary embodiment of the present application. The method in FIG. 3 may be executed by the controller or computing device in FIG. 1. For convenience of understanding, the method for acquiring an image is described in detail in conjunction with the system shown in FIGS. 1 and 2. As shown in FIG. 3, the method for acquiring an image includes the following. It should be noted that, the method for acquiring an image according to this embodiment corresponds to the system for acquiring an image according to the embodiment in FIG. 2. To avoid repetition, the similarities will not be elaborated.

310. adjusting a positional relationship between a light source and a correction reference, as well as a direction in which the light source illuminates the correction reference, so that illuminations in different regions on the correction reference meet a predetermined uniformity condition.

Specifically, the positional relationship between the light source and the correction reference includes distances in a horizontal and vertical directions between the light source and the correction reference. In the case that the light source includes a plurality of light sub-sources, the positional relationship between the light source and the correction reference may include a distance between each of the light sub-sources and the correction reference, as well as distances between the plurality of light sub-sources.

The direction in which the light source illuminates the correction reference may be represented by an angle formed by the light emitting direction from the center point of the light source and the normal direction of a surface of the correction reference, or by an angle formed by the light emitting direction from the center point of the light source and the surface of the correction reference. According to some embodiments, at least the illuminations in different regions on the correction reference corresponding to the wide-angle range of the lens of the image acquisition device to be corrected meet the predetermined uniformity condition.

By adjusting the positional relationship between the light source and the correction reference, the illuminations in different regions on the correction reference meet the predetermined uniformity condition, thereby providing a uniform illumination environment for the image acquisition device to be corrected.

It should be noted that, for specific explanations of the illuminations in different regions on the correction reference meeting the predetermined uniformity condition, please refer to the embodiment shown in FIG. 1. To avoid repetition, this will not be elaborated here.

320. acquiring at least one image of the correction reference by an image acquisition device to be corrected if the uniformity condition is met.

Specifically, after the illuminations in different regions on the correction reference meet the predetermined uniformity condition, an image acquisition device with a wide-angle lens may be used to acquire one or more images of the correction reference. For example, the image acquisition device may be used to acquire a plurality of images of the correction reference in the same or different directions.

330. generating a correction image based on the at least one image, wherein the correction image is used to perform lens shading correction on the image acquisition device.

Specifically, when one image is acquired, it may be directly used as the correction image; while when a plurality of images are acquired, fusion processing may be performed thereon to generate the correction image.

According to some embodiments, when the illumination uniformity of the correction reference is relatively high, the image acquisition device may acquire one image as the correction image.

The embodiments of the present application provide a method for acquiring an image, which adjusts the positional relationship between the light source and the correction reference, as well as the direction in which the light source illuminates the correction reference, so as to provide the correction reference with uniform illumination. Then, at least one image of the correction reference is acquired utilizing the image acquisition device to be corrected. And, the correction image obtained based on the at least one image may be used to perform lens shading correction on the image acquisition device. The method for acquiring an image does not require an expensive integrating sphere, and may be performed in a normal image quality laboratory environment, which may reduce purchase and maintenance costs of a testing device for obtaining a correction image.

It should be understood that, the method in FIG. 3 may also be manually operated by an operator. For example, the operator may move the position and orientation of the light source, and determine whether the illuminations are uniform in different regions based on values displayed by illumination measuring instruments provided in different regions of the correction reference.

According to an embodiment, the image acquisition device is provided on a normal line that passes through the center point of the correction reference. And, the light source includes a plurality of light sub-sources. In addition, the adjusting a positional relationship between a light source and a correction reference includes adjusting the positional relationship between the light source and the correction reference under the condition that the plurality of light sub-sources are symmetrically provided along the normal line as an axis.

Specifically, the image acquisition device is provided on a normal line that passes through the center point of the forward-facing correction reference. Furthermore, positions of the plurality of light sub-sources are adjusted, so that the plurality of light sub-sources are symmetrically distributed along the normal line as an axis, which may improve uniformity of the illuminations in different regions on the correction reference, and at the same time, also shorten the adjustment time. The method according to this embodiment is advantageous in providing the correction reference with uniform brightness, providing a uniform light source environment for obtaining the correction image, thereby improving accuracy of the correction parameter and the correction effect of lens shadings.

For example, a baseline that passes through the normal line and is parallel to the surface of the correction reference may be provided. And, the plurality of light sub-sources may be uniformly provided on this baseline. For example, the baseline may be a straight line, or a circle or polygon centered on the normal line. When the baseline is a straight line, the plurality of light sub-sources may be uniformly provided on two sides of the normal line along the baseline. When the baseline is a circle, the plurality of light sub-sources may be uniformly provided around the normal line along the circumference. When the baseline is a polygon, the plurality of light sub-sources may be provided at the vertexes thereof, respectively.

According to an embodiment, the image acquisition device is provided between at least one light source and the correction reference.

Providing the image acquisition device between the light source and the correction reference may prevent the light source from appearing within the field of view of the image acquisition device, thus providing a more favorable positional condition for the image acquisition device to acquire an image. In this case, when performing step 310, it is also possible to adjust the distance between the image acquisition device to be corrected and the correction reference simultaneously, to minimize the presence of a shading or a plurality of overlapping shadings from the image acquisition device on the correction reference, to ensure that the correction reference meets the condition of uniform illumination.

According to an embodiment, the image acquisition device is provided with at least one layer of diffuser in front of the lens thereof.

The provision of the diffuser may further provide uniform incident light for the image acquisition device, compensate for the illumination uniformity of the correction reference, and thus a uniform light source environment for acquisition of the correction image, in order to improve accuracy of the correction parameter and the correction effect of lens shadings.

Optionally, several layers of diffusers may provide more uniform incident light, as compared with a single layer of diffuser.

The provision of a flexible diffuser may further compensate for the illumination uniformity of the correction reference, thereby providing a uniform light source environment for acquisition of the correction image, in order to improve accuracy of the correction parameter and the correction effect of lens shadings.

According to an embodiment, the at least one layer of diffuser is a frosted sheet.

The frosted sheet may be a matt film with a frosted effect, or a transparent adhesive tape with a frosted effect.

Optionally, a fine-grained frosted sheet may be selected to further improve uniformity of incident light on the lens.

According to an embodiment, the distance D between a surface of the at least one layer of diffuser close to the lens of the image acquisition device and the lens of the image acquisition device meets that 0 mm<D≤2 mm.

For example, the distance between the diffuser and the lens of the image acquisition device is set to 1 mm, and it is demonstrated by experiments that, the image generated after lens shading correction on the correction image acquired by this setting has a better uniformity effect.

Optionally, when providing a diffuser in front of the lens, avoiding wrinkles on the diffuser to improve uniformity of incident light on the lens.

Optionally, when providing several layers of diffusers in front of the lens, avoiding formation of bubbles between the several layers of diffusers to improve uniformity of incident light on the lens.

Optionally, the light source may be an LED flexible light source.

Optionally, a softbox may be provided at the light source to improve the illumination uniformity on the correction reference.

According to an embodiment, the acquiring at least one image of the correction reference by an image acquisition device to be corrected includes utilizing the image acquisition device to acquire at least one image from a plurality of different angles, respectively, to obtain a plurality of images. And, the generating a correction image based on the at least one image includes averaging the plurality of images to generate the correction image.

An angle between the lens of the image acquisition device and the correction reference is adjusted, to acquire at least one image from a plurality of different shooting angles. And, a plurality of images are averaged, to result into an averaged image as the correction image. On one hand, it may denoise the acquired images to acquire the plurality of images in the same direction. On the other hand, acquiring images from a plurality of different angles may compensate for the illumination uniformity of the correction reference, and provide a uniform light source environment for acquisition of the correction image, in order to improve accuracy of the correction parameter and the correction effect of lens shadings.

Figure 4:
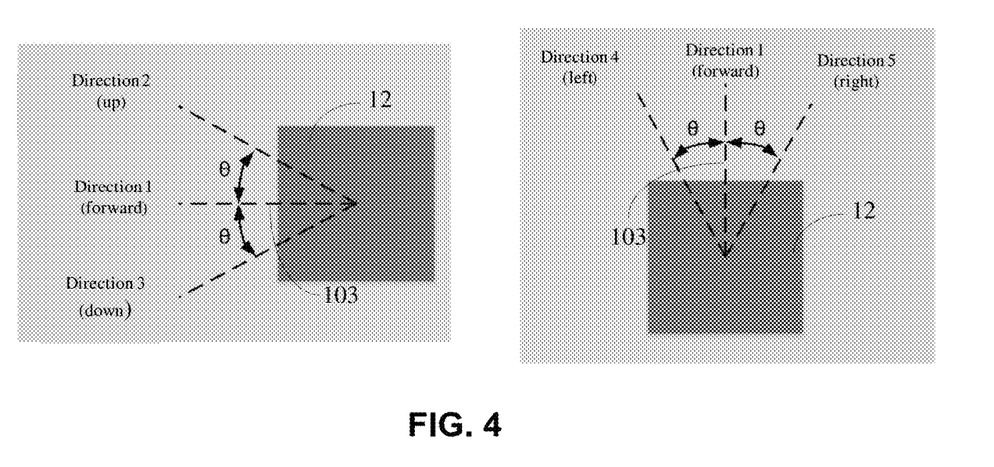
FIG. 4 shows a schematic view of an image acquisition device with different shooting angles according to an exemplary embodiment of the present application.

FIG. 4 shows a schematic view of an image acquisition device with different shooting angles according to an exemplary embodiment of the present application.

As shown in FIG. 4, a plurality of different shooting angles include a forward direction (the normal direction on the surface of the correction reference) in which the lens of the image acquisition device faces the correction reference, as well as four directions of up, down, left, and right at predetermined angles θ to the forward direction, with the predetermined angles θ not exceeding 45 degrees.

Furthermore, at least one image is acquired in the five different directions mentioned above, with the exposure time, gain, and aperture of the image acquisition device being kept unchanged. And, a plurality of images is averaged, to use the averaged image as the correction image. This method may play a certain compensation role in regions with poor illumination uniformity on the correction reference, making the generated correction image more meet the requirements of uniform illumination, improving accuracy of the correction parameter, and thus improving precision of lens shading correction. For example, the image acquisition device is used to acquire images in a plurality of symmetrical shooting directions, to further obtain the correction image with uniform brightness.

Exemplarily, the image acquisition device acquires 16 images in the five different directions mentioned above, respectively, to acquire 80 images in total. And, the data matrix of the 80 images is then respectively accumulated pixel by pixel and then averaged, to ultimately generate the correction image.

Figure 5:
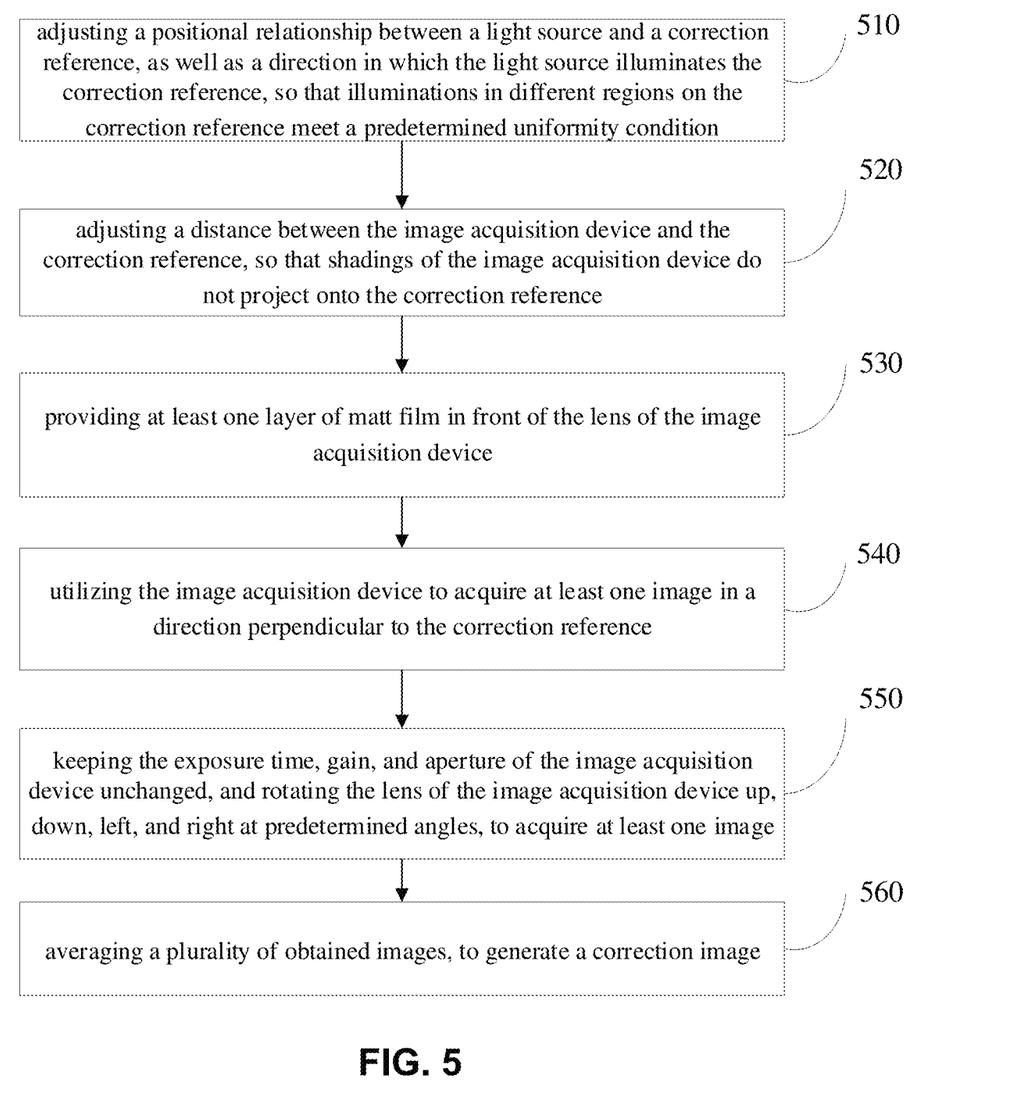
FIG. 5 shows a schematic flowchart of a method for acquiring an image according to another exemplary embodiment of the present application.

FIG. 5 shows a schematic flowchart of a method for acquiring an image according to another exemplary embodiment of the present application. As shown in FIG. 5, this method includes the following. It should be noted that, the embodiment in FIG. 5 is an example of the embodiment in FIG. 3, and the similarities will not be elaborated, while the differences will be described with emphasis here.

510. adjusting a positional relationship between a light source and a correction reference, as well as a direction in which the light source illuminates the correction reference, so that illuminations in different regions on the correction reference meet a predetermined uniformity condition.

Specifically, the illumination distribution on the correction reference shall meet the uniformity condition at least within the field of view of the image acquisition device.

520. adjusting a distance between the image acquisition device and the correction reference, so that shadings of the image acquisition device do not project onto the correction reference.

530. providing at least one layer of matt film in front of the lens of the image acquisition device.

Specifically, the matt film may be provided symmetrically in semi-spherical surface at a distance of 1 mm from the lens.

540. utilizing the image acquisition device to acquire at least one image in a direction perpendicular to the correction reference.

550. keeping the exposure time, gain, and aperture of the image acquisition device unchanged, and rotating the lens of the image acquisition device up, down, left, and right at predetermined angles, to acquire at least one image.

560. averaging a plurality of obtained images, to generate a correction image.

Exemplary Experimental Test

Figure 6:
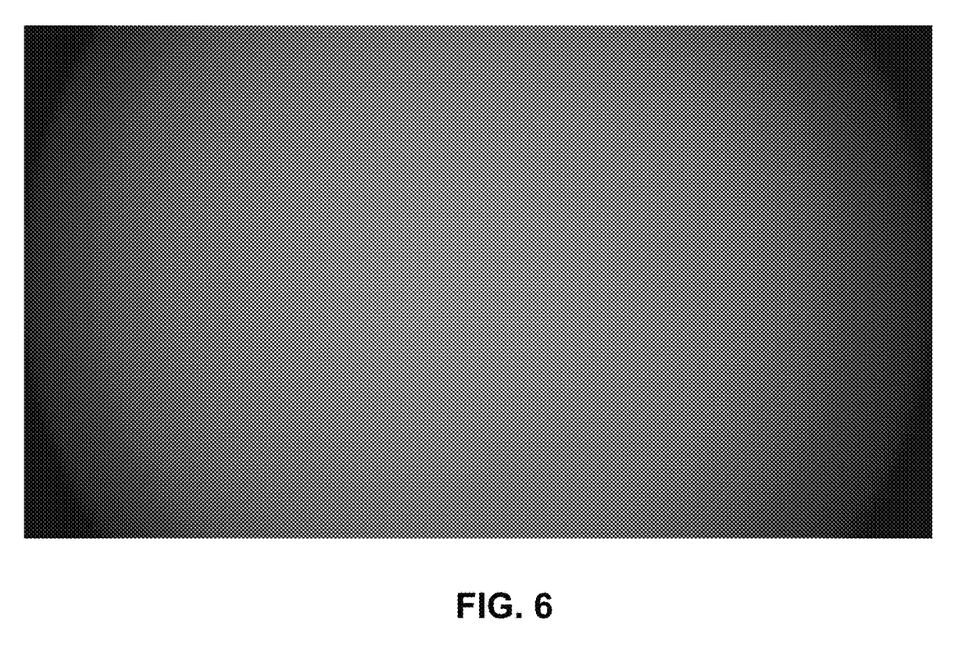
FIG. 6 shows a schematic view of a correction image obtained using the system and method for acquiring an image according to the embodiments of the present application.
Figure 7:
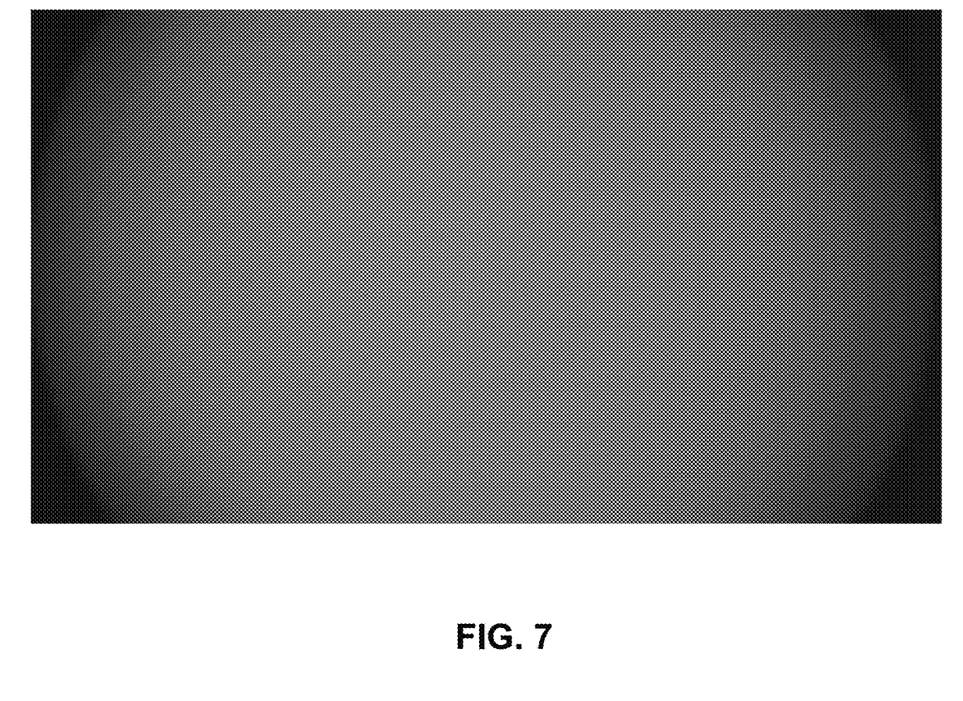
FIG. 7 shows a schematic view of a correction image obtained using an integrating sphere device.

FIG. 6 shows a schematic view of a correction image obtained using the system and method for acquiring an image according to the embodiments of the present application. FIG. 7 shows a schematic view of a correction image obtained using an integrating sphere device.

As shown in FIGS. 6 and 7, the correction image obtained using the system and method for acquiring an image according to the embodiments of the present application is very close to that obtained using an integrating sphere device. This demonstrates that the system and method for acquiring an image according to the embodiments of the present application have relatively high reliability and accuracy. In addition, this saves the purchase and subsequent maintenance costs of the integrating sphere device.

Figure 8A:
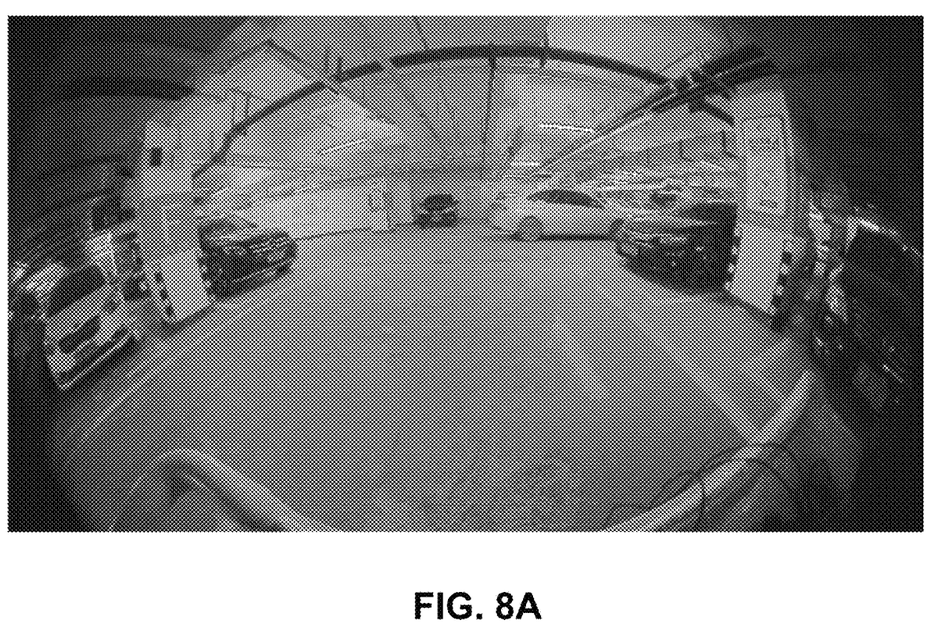
FIG. 8a shows a schematic view of an image without lens shading correction.
Figure 8B:
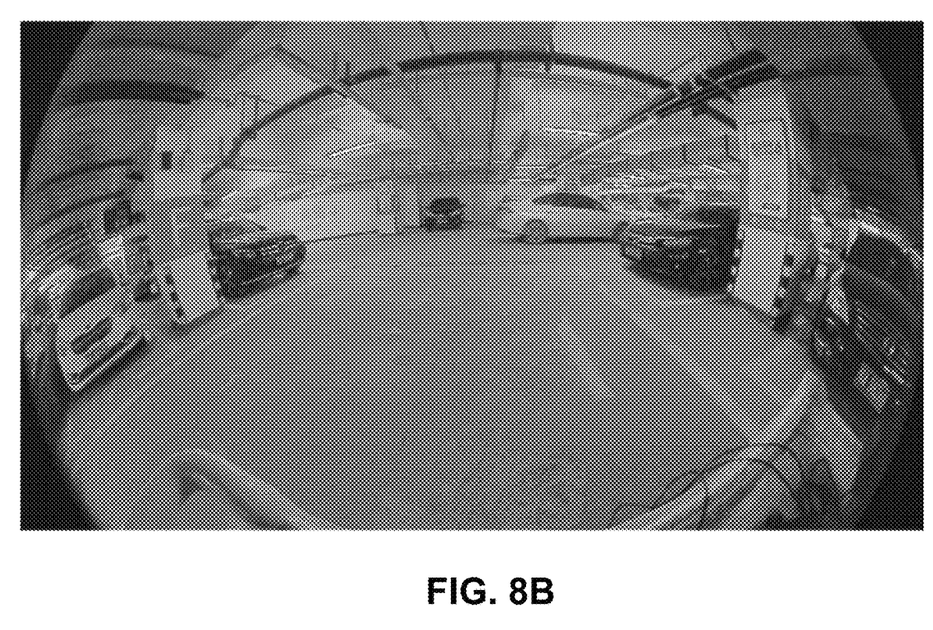
FIG. 8b shows a schematic view of an image undergone lens shading correction using an integrating sphere device.
Figure 8C:
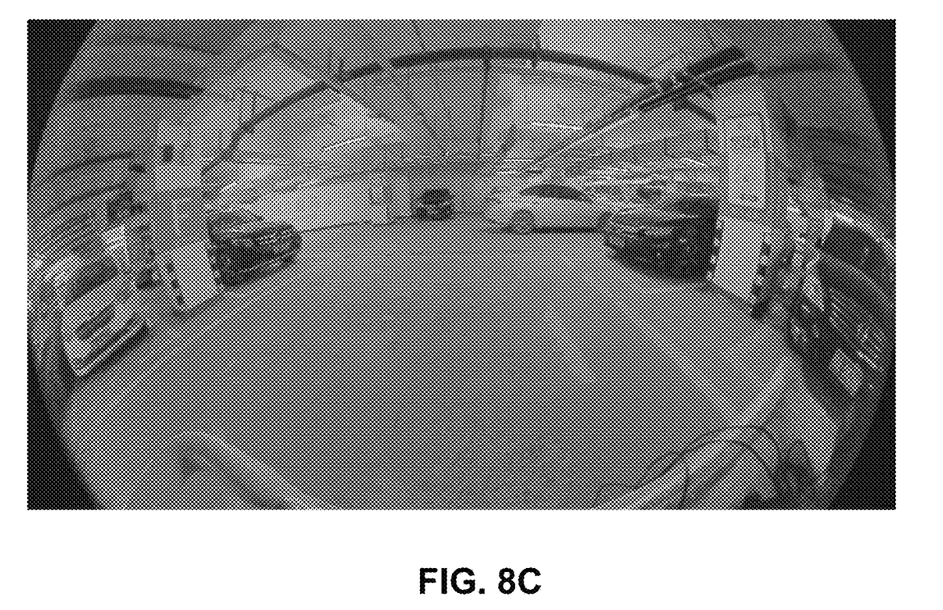
FIG. 8c shows a schematic view of an image undergone lens shading correction using the system and method for acquiring an image according to the embodiments of the present application.

FIG. 8a shows a schematic view of an image without lens shading correction. FIG. 8b shows a schematic view of an image undergone lens shading correction using an integrating sphere device. FIG. 8c shows a schematic view of an image undergone lens shading correction using the system and method for acquiring an image according to the embodiments of the present application.

As shown in FIGS. 8a, 8b, and 8c, it can be seen after comparison that, the quality of the image obtained after correction using the system and method for acquiring an image according to the embodiments of the present application is very close to that of the image obtained after correction using the integrating sphere device. This demonstrates that the system and method for acquiring an image according to the embodiments of the present application have relatively high reliability and accuracy. In addition, this saves the purchase and subsequent maintenance costs of the integrating sphere device.

Figure 9:
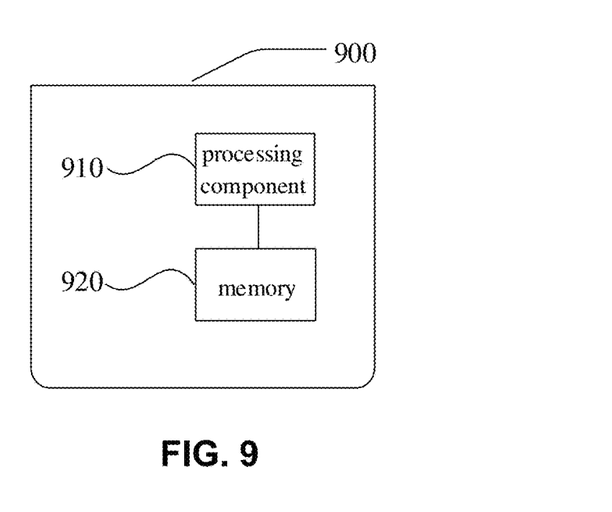
FIG. 9 shows a block diagram of an electronic device for executing the method for acquiring an image according to an exemplary embodiment of the present application.

FIG. 9 shows a block diagram of an electronic device 900 for executing the method for acquiring an image according to an exemplary embodiment of the present application.

As shown in FIG. 9, the electronic device 900 includes a processing component 910, which further includes one or more processors; and a memory resource represented by a memory 920 for storing instructions, such as an application program, that may be executed by the processing component 910. The application program stored in the memory 920 may include one or more modules each of which corresponds to a set of instructions. In addition, the processing component 910 is configured to execute instructions to execute the method for acquiring an image described above.

The electronic device 900 may also include a power component configured to perform power management of the electronic device 900, a wired or wireless network interface configured to connect the electronic device 900 to a network, and an input/output (I/O) interface. The electronic device 900 may be operated based on an operating system stored in the memory 920, such as Windows Server™, Mac OS X™, Unix™, Linux™, FreeBSD™, or the like.

Figure 10:
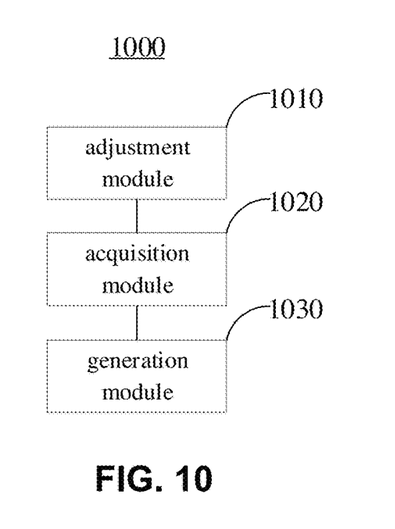
FIG. 10 shows a schematic structure diagram of an apparatus for acquiring an image according to an exemplary embodiment of the present application.

FIG. 10 shows a schematic structure diagram of an apparatus 1000 for acquiring an image according to an exemplary embodiment of the present application.

As shown in FIG. 10, the apparatus 1000 for acquiring an image includes an adjustment module 1010, an acquisition module 1020, and a generation module 1030.

The adjustment module 1010 is used for adjusting a positional relationship between a light source and a correction reference, as well as a direction in which the light source illuminates the correction reference, so that illuminations in different regions on the correction reference meet a predetermined uniformity condition.

The acquisition module 1020 is used for acquiring at least one image of the correction reference by an image acquisition device to be corrected if the uniformity condition is met.

The generation module 1030 is used for generating a correction image based on the at least one image, and wherein the correction image is used to perform lens shading correction on the image acquisition device.

The embodiments of the present application provide an apparatus for acquiring an image, which adjusts the positional relationship between the light source and the correction reference, as well as the direction in which the light source illuminates the correction reference, so as to provide the correction reference with uniform illumination. Then, at least one image of the correction reference is acquired utilizing the image acquisition device to be corrected. And, the correction image obtained based on the at least one image may be used to perform lens shading correction on the image acquisition device. The apparatus for acquiring an image does not require an expensive integrating sphere, and may be operated in a normal image quality laboratory environment, which may reduce purchase and maintenance costs of a testing device for obtaining a correction image.

According to an embodiment, the image acquisition device is provided on a normal line which passes through the center point of the correction reference. And, the light source includes a plurality of light sub-sources. In addition, the adjustment module 1010 is further used to adjust the positional relationship between the light source and the correction reference under the condition that the plurality of light sub-sources are symmetrically provided along the normal line as an axis.

According to an embodiment, the image acquisition device is provided with at least one layer of diffuser in front of a lens thereof.

Optionally, the at least one layer of diffuser includes several layers of flexible diffusers, and is configured to be symmetrically provided in an arc shape in front of the lens of the image acquisition device.

Optionally, the at least one layer of diffuser is a frosted sheet.

Optionally, the distance D between a surface of the at least one layer of diffuser close to the lens of the image acquisition device and the lens of the image acquisition device meets that 0 mm<D≤2 mm.

According to an embodiment, the acquisition module 1020 is further used to acquire at least one image from a plurality of different angles, respectively, using an image acquisition device, to obtain a plurality of images. Optionally, at least one image is respectively acquired in the five different directions mentioned above, to obtain a plurality of images, with the exposure time, gain, and aperture of the image acquisition device being kept unchanged.

According to an embodiment, the generation module 1030 is further used to average the plurality of images, to generate the correction image.

According to an embodiment, the different angles include the forward direction in which the lens of the image acquisition device faces the correction reference, as well as four directions of up, down, left, and right at predetermined angles θ to the forward direction, with the predetermined angles θ not exceeding 45 degrees. A non-temporary computer-readable storage medium enables the electronic device 900 to execute an method for acquiring an image, when instructions therein are executed by the processor of the above electronic device 900. The method for acquiring an image includes adjusting a positional relationship between a light source and a correction reference, as well as a direction in which the light source illuminates the correction reference, so that illuminations in different regions on the correction reference meet a predetermined uniformity condition; acquiring at least one image of the correction reference utilizing the image acquisition device to be corrected if the uniformity condition is met; and obtaining a correction image based on the at least one image, wherein the correction image is used to perform lens shading correction on the image acquisition device.

All the optional technical solutions mentioned above may form optional embodiments of the present application by any combination, and will not be elaborated one by one here.

It should be realized by those skilled in the art that, the various exemplary units and algorithm steps described in combination with the embodiments disclosed herein may be realized in electronic hardware, or a combination of computer software and electronic hardware. It depends on the specific application and design constraints of the technical solution whether these functions are executed in a manner of hardware or software. Different methods may be used by professional technicians to achieve the described functions for each specific application, but such achievements should not be considered beyond the scope of the present application.

It may be clearly understood by those skilled in the art that, the specific working processes of the system, device, and unit described above may refer to the corresponding processes in the method according to the aforementioned embodiments for convenience and conciseness of description, and will not be elaborated here.

It should be understood that, the system, device, and method disclosed in the embodiments according to the present application may be achieved in other ways. For example, the device embodiments described above are only schematic. For example, the division of the units is only a logical functional division, and may be in another form in actual achievements. For example, a plurality of units or components may be combined or integrated into another system, or some features may be ignored or not executed. In addition, the displayed or discussed coupling or direct coupling or communication connection to each other may be indirect coupling or communication connection through some interfaces, devices or units, and may be electrical, mechanical or in other forms.

The units described as separate parts may be or may not be physically separated. And, the parts displayed as units may be or may not be physical units, that is, may be located in one place or distributed across a plurality of network units. A part or all of the units may be selected according to actual needs, to achieve the purpose of this embodiment.

In addition, the various functional units in various embodiments of the present application may be integrated into a single processing unit, may each physically present, or may present by means of two or more units thereof being integrated into one unit.

The function may be stored in a computer-readable storage medium if it is achieved in a form of a software functional unit and sold or used as an independent product. Based on this understanding, the technical solutions of the present application essentially, or a portion thereof that contributes to the existing technology, or a portion thereof, may be embodied in a form of a software product, which is stored in a storage medium, and includes several instructions to enable a computer device (a personal computer, server, or network device, etc.) to perform all or part of the steps of the methods described in the various embodiments of the present application. The aforementioned storage medium may include USB flash disks, Mobile Hard disks, Read-only memories (ROM), Random Access memories (RAM), magnetic disks or optical disks and other various media that may store program check codes.

It should be noted that, the terms "first", "second", "third", etc. in the description of the present application are only used for descriptive purposes, and may not be understood as indicating or implying relative importance. In addition, in the description of the present application, unless otherwise specified, "a plurality of" means two or more.

The above is only preferred embodiments of the present application, and is not intended to limit the present application. Any modifications, equivalents, etc. made within the spirit and principles of the present application should be included in the scope of protection of the present application.

The invention claimed is:

1. A system for acquiring an image, comprising a light source, a correction reference, an illumination measurement device, and an image acquisition device to be corrected,
wherein the illumination measurement device is configured to measure luminous intensity in different regions on the correction reference,
wherein the light source is configured to adjust a positional relationship thereof relative to the correction reference and a direction in which the light source illuminates the correction reference based on the measured luminous intensity, so that the measured luminous intensity in the different regions on the correction reference meets a predetermined uniformity condition; and
wherein the image acquisition device is configured to acquire at least one image of the correction reference responsive to the uniformity condition being met, and the at least one image is used to obtain a correction image which is used to perform lens shading correction on the image acquisition device.

2. The system for acquiring an image according to claim 1, wherein the image acquisition device is provided on a normal line that passes through the center point of the correction reference, and the light source comprises a plurality of light sub-sources which are symmetrically provided along the normal line as an axis.

3. The system for acquiring an image according to claim 1, wherein the image acquisition device is provided between at least one light source and the correction reference.

4. The system for acquiring an image according to claim 1, further comprising at least one layer of diffuser that is provided in front of a lens of the image acquisition device.

5. The system for acquiring an image according to claim 4, wherein the at least one layer of diffuser comprises several layers of flexible diffusers, and is configured to be symmetrically provided in an arc shape in front of the lens of the image acquisition device.

6. The system for acquiring an image according to claim 4, wherein the at least one layer of diffuser is a frosted sheet.

7. The system for acquiring an image according to claim 4, wherein a distance D between a surface of the at least one layer of diffuser close to the lens of the image acquisition device and the lens of the image acquisition device meets that 0 mm<D≤2 mm.

8. The system for acquiring an image according to claim 1, further comprising a controller that is configured to adjust the positional relationship between the light source and the correction reference, as well as the direction in which the light source illuminates the correction reference, through a drive device.

9. A method for acquiring an image executed by a system, wherein the system comprises a light source, a correction reference, and an image acquisition device to be corrected, the method comprising:
measuring luminous intensity in different regions on the correction reference;
adjusting a positional relationship between the light source and the correction reference, and a direction in which the light source illuminates the correction reference based on the measured luminous intensity, so that the measured luminous intensity in the different regions on the correction reference meets a predetermined uniformity condition;
acquiring at least one image of the correction reference by the image acquisition device to be corrected responsive to the uniformity condition being met; and
generating a correction image based on the at least one image, wherein the correction image is used to perform lens shading correction on the image acquisition device.

10. The method according to claim 9, wherein the image acquisition device is provided on a normal line that passes through the center point of the correction reference, and the light source comprises a plurality of light sub-sources which are symmetrically provided along the normal line as an axis.

11. The method according to claim 9, wherein the image acquisition device is provided between at least one light source and the correction reference.

12. The method according to claim 9, further comprising positioning at least one layer of diffuser that is provided in front of a lens of the image acquisition device.

13. The method according to claim 12, wherein the at least one layer of diffuser comprises several layers of flexible diffusers, and is symmetrically provided in an arc shape in front of the lens of the image acquisition device.

14. The method according to claim 12, wherein the at least one layer of diffuser is a frosted sheet.

15. The method according to claim 12, wherein a distance D between a surface of the at least one layer of diffuser close to the lens of the image acquisition device and the lens of the image acquisition device meets that 0 mm<D≤2 mm.

16. The method according to claim 9, further comprising adjusting the positional relationship between the light source and the correction reference, as well as the direction in which the light source illuminates the correction reference, through a drive device.

17. An electronic device, comprising:
a processor; and
a memory for storing instructions which when executed by the processor cause the processor to perform a method for acquiring an image, the method comprising:
measuring luminous intensity in different regions on the correction reference;
adjusting, based on the measured luminous intensity, a positional relationship between a light source and a correction reference, and a direction in which the light source illuminates the correction reference, so that the measured luminous intensity in the different regions on the correction reference meets a predetermined uniformity condition;
acquiring at least one image of the correction reference by an image acquisition device to be corrected responsive to the uniformity condition being met; and
generating a correction image based on the at least one image, wherein the correction image is used to perform lens shading correction on the image acquisition device.

18. The electronic device according to claim 17, wherein the image acquisition device is provided on a normal line that passes through the center point of the correction reference, and the light source comprises a plurality of light sub-sources which are symmetrically provided along the normal line as an axis.

19. The electronic device according to claim 17, wherein the image acquisition device is provided between at least one light source and the correction reference.

20. The electronic device according to claim 17, wherein the method further comprises positioning at least one layer of diffuser that is provided in front of a lens of the image acquisition device.

* * * * *